June 27, 1961
R. W. JOY
2,989,931
HOPPER DISCHARGE CONTROL DEVICE AND
METHOD OF ASSEMBLING THE SAME
Filed Feb. 28, 1957
4 Sheets-Sheet 3

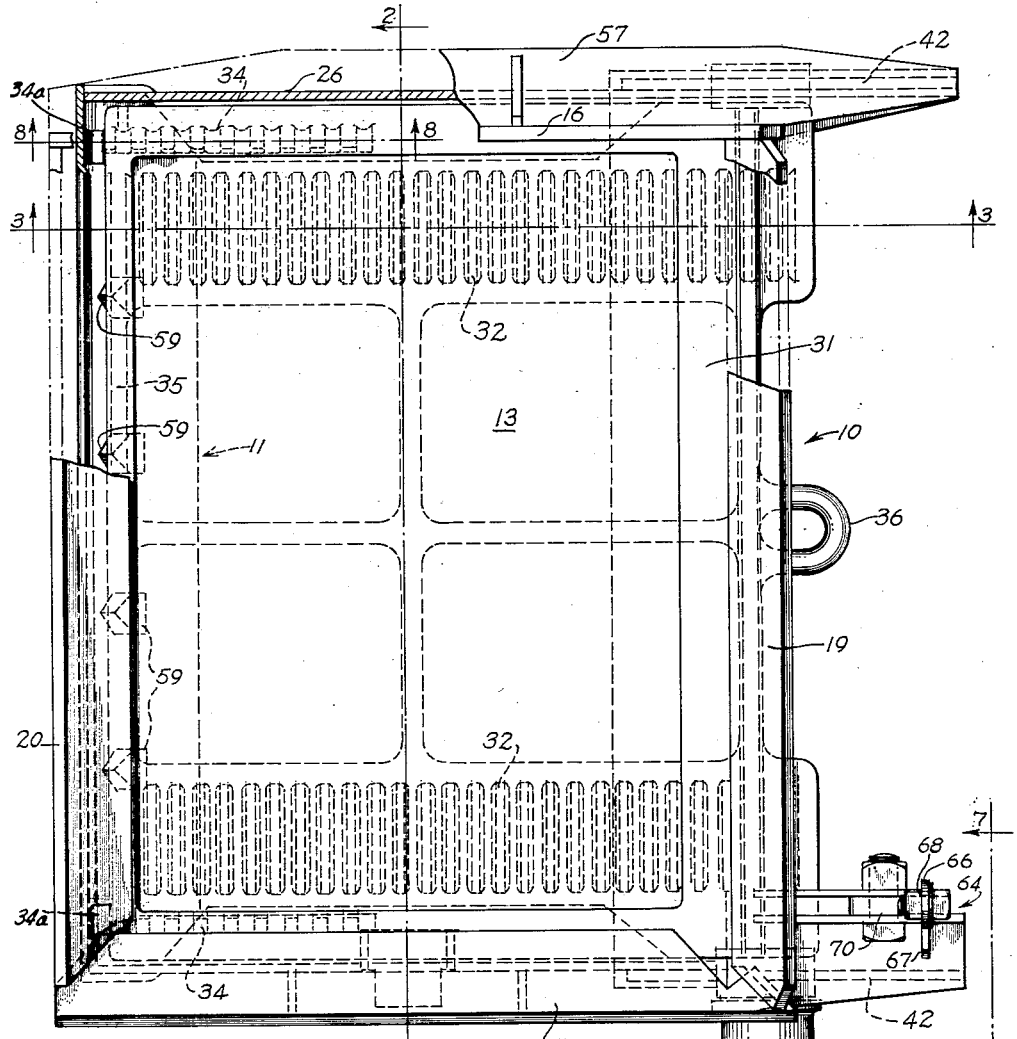

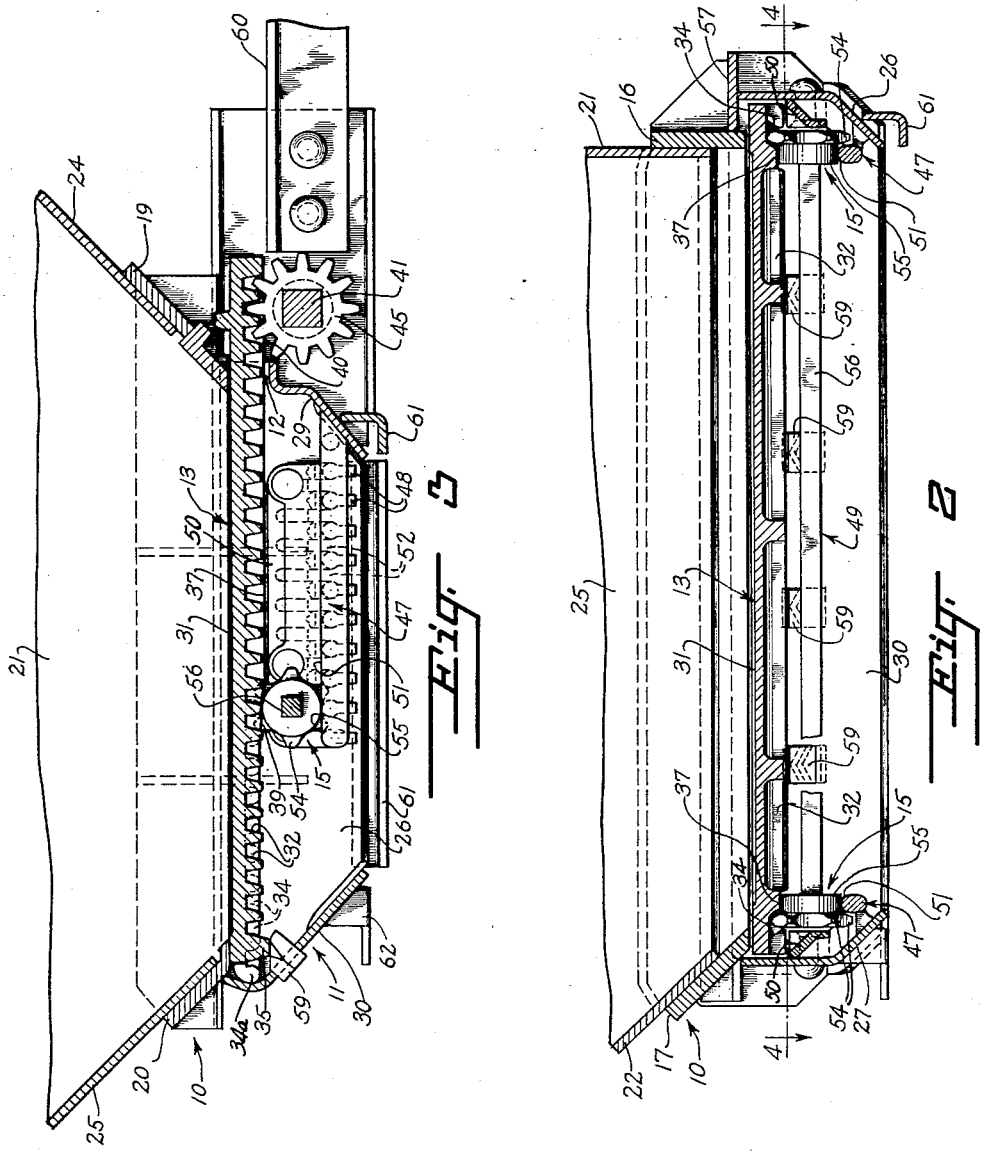

INVENTOR
Robert W. Joy

BY Robert A. Shields
ATTORNEY

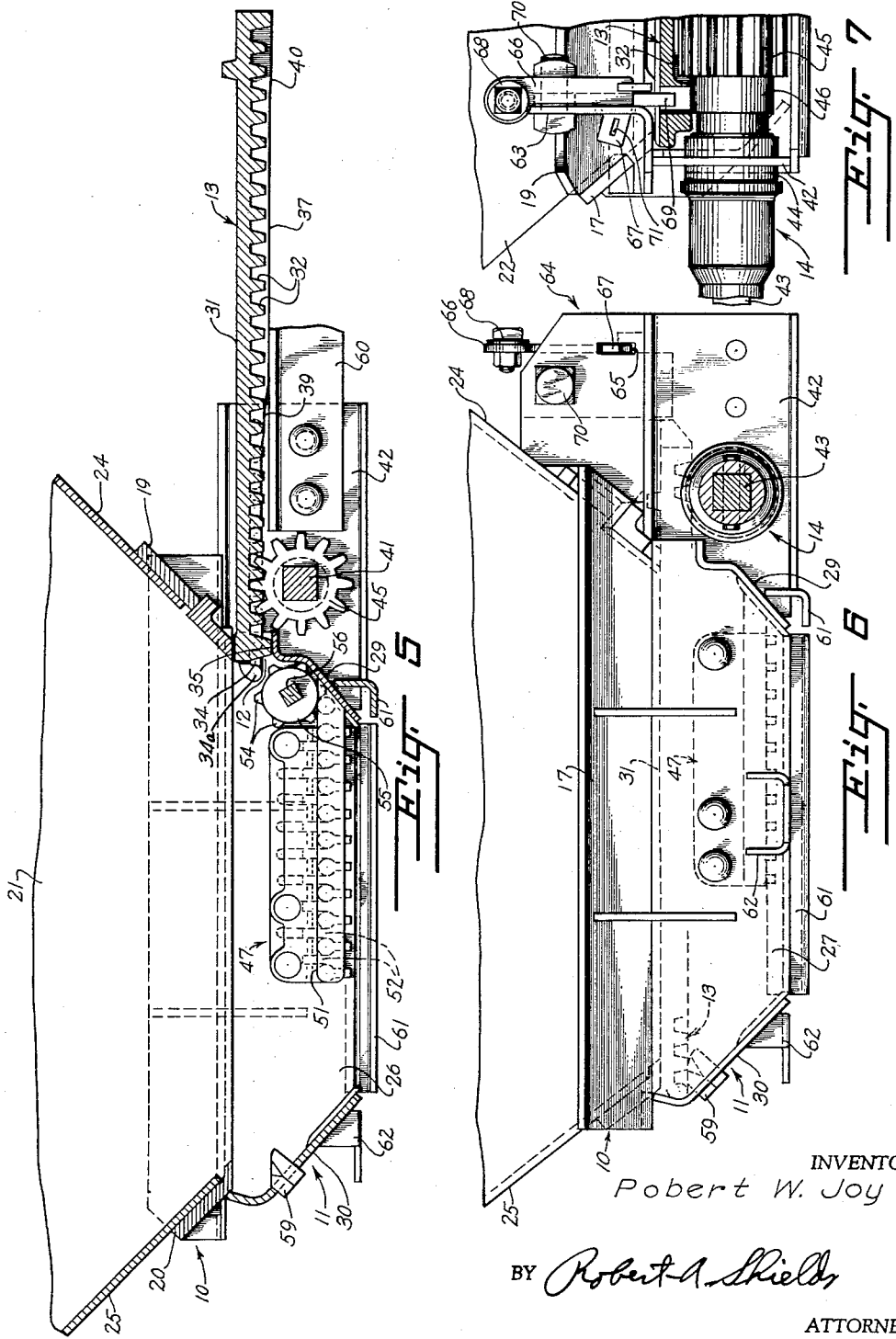

United States Patent Office 2,989,931
Patented June 27, 1961

2,989,931
HOPPER DISCHARGE CONTROL DEVICE AND METHOD OF ASSEMBLING THE SAME
Robert W. Joy, Garden City, N.Y., assignor to ACF Industries, Incorporated, New York, N.Y., a corporation of New Jersey
Filed Feb. 28, 1957, Ser. No. 642,996
10 Claims. (Cl. 105—282)

This invention relates generally to hoppers for containment and discharge of comminuted or pulverulent material and the like, and, more particularly, to discharge control apparatus for railway hopper cars and to a method of assembling the same.

A persistent problem which has long been faced in the railway field is that of unloading hopper cars. Due to the nature of the material mentioned above, it frequently compacts in the hoppers because of vibration and cakes therein and in the discharge mechanism due to the effect of moisture. Since, for convenience, hoppers often discharge downwardly through an opening controlled by a gate type closure, the closure bears a large part of the weight of the material in the hopper. This, combined with the compacting and caking of the material, often causes such closures to freeze closed and to render opening difficult and time consuming.

In order to overcome these difficulties, various devices have been proposed which would operate to effect a good closure to prevent escape of material or entrance of moisture, and render opening easier by reducing friction between the closure and its associated parts. While certain of these devices have represented advances in the art, they have not proven to be completely satisfactory in that there are still many cases of freezing or jamming of the closure or its associated mechanism.

A further problem in manufacture of hopper car closure devices is that they do not command a high price and therefore the amount of labor which can be expended in producing close fit of mating parts is limited.

Accordingly, it is an object of the present invention to provide a hopper discharge control device or assembly which overcomes the foregoing difficulties and disadvantages.

Another object is to provide such an assembly wherein friction encountered between the parts when opening and closing the closure member is reduced to a minimum.

Another object is to provide such an assembly wherein the parts most likely to become contaminated by lading accumulation are self-cleaning.

Another object is to provide an efficient and economical method of assembling a discharge unit for use in connection with hopper discharge openings.

Another object is to provide such an assembly which may be readily applied to many of the railway hopper car hoppers now in service.

A further object is to provide such an assembly wherein the closure is supported in its closed position in tight sealing relation with the opening so as to prevent leakage.

A still further object is to provide such an assembly which is economical to manufacture, reliable in operation and simple to construct and maintain.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing, in a hopper having a discharge opening therein, a gate movable in a path parallel to the opening for controlling it, means for moving the gate in the path, and gate supporting means mounted on the hopper and having a member movable with the gate to support the same in closed position and during movement away from and towards closed position, the supporting means during movement of the gate moving relative to the gate as well as to the frame, and having a member engaging the undersurface of the gate at the longitudinal midpoint of the portion of the gate which is in the opening.

Preferably, the gate supporting means is mounted on the hopper through a frame which is secured to the hopper side walls and which is provided with a slot through which the gate passes. Said frame is formed with upper and lower portions, the lower portion supporting the gate and the upper portion resting entirely on the gate and being contacted by and joined to the lower portion but not supported by said lower portion except indirectly by resting on the gate as noted. The frame is thus built around the gate and the desirable close fit of mating parts is thus obtained with minimum labor cost.

A preferred embodiment of the invention has been chosen for purposes of illustration and description, and is shown in the accompanying drawing, forming a part of the specification wherein:

FIG. 1 is a top plan view, partially broken away, of a hopper discharge assembly in accordance with the present invention;

FIG. 2 is a sectional view taken along the lines 2—2 of FIG. 1;

FIG. 3 is a sectional view taken along the lines 3—3 of FIG. 1;

FIG. 6 is a side view of the assembly illustrating portions of the gate in closed position in broken lines;

FIG. 7 is an end view taken along the lines 7—7 of FIG 1;

FIG. 8 is a sectional view taken along the lines 8—8 of FIG. 1; and

FIG. 9 is a perspective view of a bracket constituting a portion of the gate supporting means.

Figure 4:
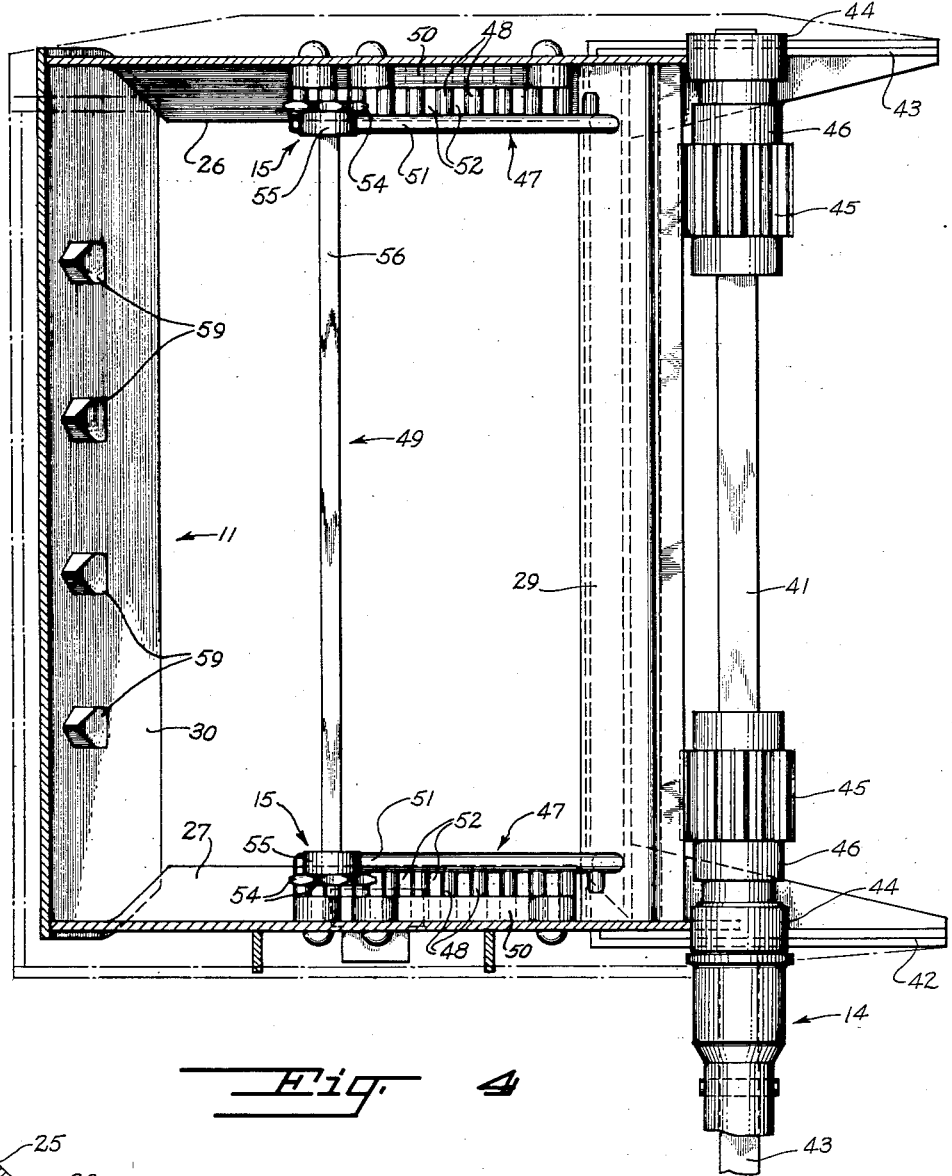
FIG. 4 is a sectional view taken along the lines 4—4 of FIG. 2.

Referring to the drawing, and, more particularly, to FIGS. 1 to 6 thereof, there is shown a hopper discharge assembly comprising a rectangular frame formed of an upper rectangular portion 10 and a lower rectangular portion 11 defining a slot 12 extending almost for the entire length of one side thereof, the portion 11 providing a discharge chute for the hopper, a gate 13 movable in the slot, actuating means 14 outside of the frame for moving the gate 13, and gate supporting means 15 mounted on the frame and movable with the gate to support the same.

The upper portion 10 of the frame includes longitudinally extending right and left side walls 16 and 17 which are joined with sloping rear and front end walls 19 and 20. These walls are respectively secured to hopper side walls 21, 22, 24 and 25 with which they are parallel and converge to form a rectangular discharge opening at the bottom of the hopper and defined by the bottom surfaces of the upper portion. The same walls of the upper portion 10 of the frame also respectively overlie right, left, rear and front walls 26, 27, 29 and 30 respectively which are joined to form the lower portion 11 of the frame. Corresponding walls of upper portion 10 and lower portion 11 are joined in a manner to provide the above mentioned internal downwardly facing surfaces at the lower end of the upper portion, with the exception of the rear walls 19 and 29 which are spaced to provide the slot 12 therebetween, and each wall of the frame is directed inwardly except wall 16 which is vertical to correspond to vertical hopper wall 21. The upper portion of wall 26 also is vertical.

The gate 13 is constructed of a size to enable it to move through the slot 12 to close the hopper opening. For this purpose the upper marginal surface 31 of the gate is machined so that engagement thereof with the downwardly facing surfaces of the upper frame portion 10B, when the gate is in closed position, will effectively seal the hopper. The under side of the gate is provided with a pair of spaced sets of rack teeth 32 extending longitudinally thereof and each set being disposed adjacent a side edge thereof.

Figure 5:
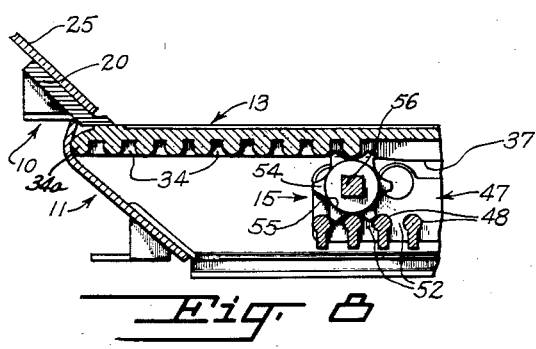
FIG. 5 is a central longitudinal section of the assembly of the present invention illustrating the position of the parts when the gate is in open position.

Between each set of rack teeth 32 and its adjacent gate edge there is formed a second set of teeth 34 parallel to the first set. These teeth are formed with rounded upper surfaces and extend from the forward end of the gate remote from the slot 12, when the gate is in closed position, approximately half the length of the gate. This forward remote end of the gate is also provided with a downwardly extending projection 35 and the opposite rear end is formed with a loop 36 extending outwardly thereof, for a purpose to be mentioned hereinafter. As shown in FIGURES 1, 3 and 5, the gate is also provided at its forward end with rounded end projections 34a which form extensions of the sets of teeth 34.

As illustrated in FIGS. 1 and 3, the gate 13 is of sufficient length so that, when in closed position, the two sets of rack teeth 32 extend through the slot 12 and terminate outwardly of the frame.

The gate is further formed with a pair of narrow surfaces or treads 37, each extending lengthwise thereof and running between the adjacent sets of teeth 32 and 34. As shown in FIGS. 3 and 5, each such tread is formed with a first ramp 39 adjacent the inner end of the teeth 34, and a second ramp 40 adjacent the rear or right hand end of the gate, as viewed. Each of the ramps 39 and 40 slopes downwardly and to the right, as viewed.

The actuating means 14 comprises essentially a shaft 41 rotatably journaled at each side of the frame in longitudinally extending tail pieces 42, suitable bushings 44 being provided for this purpose. This shaft 41 is rectangular in cross-section and has mounted thereon for rotation therewith a pair of pinions 45 each positioned to engage one set of rack teeth 32 on the gate. A hub or trunnion 46 extends outwardly from each pinion and each such hub is arranged for engagement with one of the gate treads 37 for a purpose to be described hereinafter.

In order that an operating handle 43 (only partially shown) may be attached to the shaft 41 for effecting rotation thereof, the shaft may be extended outwardly, beyond one of the tail pieces, as shown in FIGS. 1, 4 and 7.

The gate supporting means 15 mounted on the frame includes a pair of similar brackets 47, each of which is mounted on an inner surface of one of the longitudinal walls 26 and 27 of the lower frame portion 11, and a roller assembly 49 supported at its ends on the brackets for longitudinal rolling movement relative thereto.

As shown in FIG. 9, each bracket 47 is so positioned as to have one end adjacent the wall 29 and the other end underlying the end of one of the sets of teeth 34 on the underside of the gate 13 when the gate is in closed position, as best illustrated in FIG. 3. These brackets are preferably castings which, when mounted provide inwardly and downwardly sloping surfaces 50 adjacent which is formed a horizontal, longitudinally extending rail 51. A plurality of parallel, vertically extending slots 52 open at top and bottom are formed in the bracket and extend from adjacent the rail 51 to a point adjacent the upper and outer edge of the bracket to effect a grate-like appearance. Those portions of the brackets immediately adjacent the rails 51 are so shaped that, as defined by the slots 52, they present a rack of spaced, key hole shaped teeth 48 in section, as shown in FIGS. 3, 5 and 8.

Convenient built-up portions are also provided in the brackets for the reception of rivets by which the brackets and frame are secured.

The roller assembly 49 comprises a pair of sprocket wheels 54 each formed with a cylindrical trunnion or hub 55, and a shaft 56 extending between and connecting the hub centers.

To assemble the discharge apparatus described herein, the side walls 26 and 27 and end walls 29 and 30 of the lower portion 11 of the frame are welded together to form a sub-assembly after which the brackets 47 are riveted to the inner sides of the walls 26 and 27, as discussed. The roller assembly 49 is placed on the brackets so that the hubs 55 bear on the rails 51 and the sprocket teeth engage the key hole teeth 48 adjacent the rails. The roller assembly is located on the brackets at the end thereof remote from the slot 12. The two pinions 45 and the operating shaft 41 are then mounted in the tail pieces 42 and the operating handle may be pinned to the shaft outwardly of one of the tail pieces to lock this sub-assembly to the frame.

The gate 13 is then applied in closed position with the sets of teeth 34 each engaging one of the sprocket wheels 54 and with the teeth 32 engaging the pinions 45. When in this position, the ramps 39 and 40 on the underside of the gate will rest against the treads of the hubs or trunnions 55 and 46, respectively. The frame upper portion 10, the walls of which are independently assembled, is then applied by placing the bottom surface thereof in contact with the upper marginal surface 31 of the gate, the contacting surfaces having first been machined to provide an effective seal therebetween; and the upper sloping walls 17 and 20 which are adjacent to each other are brought into contact with the corresponding lower walls 27 and 30, respectively, and tack welded together.

A closing bar 57 is then applied across the top of the lower wall 26 and in abutment with the upper wall 16 and welded in place to provide a single closed wall. This construction is best shown on the right side of FIGURE 2. The assembly is then inverted and four plugs 59 are inserted through inwardly and upwardly inclined holes in the wall 30 until they contact the projection 35 of the gate 13 in which position they are maintained by welding. These plugs on their inner portions taper upwardly and inwardly, as shown, to provide a narrow surface bearing surfaces 59A and the innermost edge thereof is rounded for smooth contact with the gate 13 during closing.

In operation, assuming the gate to be closed, as seen in FIGS. 1 and 3, the gate may be opened by operating the handle 43 to rotate the pinions 45 in a clockwise direction, as viewed in FIG. 3. The pinions, by their engagement with the rack teeth 32, will draw the gate outwardly through the slot 12 to unclose the hopper.

As the gate moves out of the frame, the rounded gate teeth 34 meshing with the sprocket wheel teeth rotate the sprocket wheels so that their teeth successively intermesh with the bracket teeth 48 causing the roller asembly 49 to move under the gate in the same linear direction, towards the slot 12. The gate treads 37 are in continuous rolling contact with the hubs 55 on the roller and the hubs 46 of the actuating means 14 adjacent the pinions, by which the gate is supported for smooth movement. In this connection, it will be noted that, due to the location of the ramps 39 and 40 on the gate treads, the gate will be lowered with respect to the hopper, as soon as its opening movement begins.

When the gate is in open position, as shown in FIG. 5, it rests upon a pair of angle supports 60 secured to the tail pieces 42 for that purpose. The opposite end (not shown) of the supports may be secured to a convenient portion of adjacent, rigid structure. The rounded end projections 34a which are extensions of the sets of teeth 34 overhang the sprocket wheel teeth 54 to keep the roller assembly 49 from rolling freely away from the gate forward end when it is in open position.

In closing the hopper, the shaft 41 and pinions 45 are rotated by the operating handle in the opposite direction, thereby moving the gate towards the upper frame wall 20. The same smooth, rolling contact between gate tread 37 and hubs 46 and 55 is effected as in opening; and the sprocket wheels move the roller away from the slot 12 to continuously lend support to the gate close to the effective center thereof. As the gate approaches its closed position, the ramps 39 and 40 will engage the hubs 55 and 46, respectively, to lift the gate into hopper sealing engagement with the lower surfaces of the upper frame portion 10. The projection 35 of the gate will also rest on the plugs 59 for additional support.

It will be noted that, as the sprocket teeth enter the slots 52 between the bracket teeth 48, they will push clear any accumulated lading or other foreign matter, so as to prevent jamming or freezing between those parts. If the gate should for any reason become jammed, the loop 36 may be used for attachment of unjamming equipment.

The lower frame portion 11 may have secured to two of its adjacent exterior surfaces a pair of angle pieces 61 cooperating to provide an inwardly facing shelf for supporting the edges of a discharge boot (not shown); and the other two sides may be equipped with boot locking pin supports 62 for supporting pins adapted to maintain the boot in place on the shelf.

Since it is desirable to positively lock the gate in closed position, suitable mechanism is provided for that purpose, as shown in FIGS. 6 and 7. This mechanism comprises an L-shaped in section member 64 having its horizontal leg fixed atop one of the tail pieces and having a vertical leg 63 extending upwardly therefrom and formed with a slot 65; a latch piece 66 mounted at 68 on the member 64 for pivotal movement in a plane perpendicular to the leg 63, and having a toe portion 67 adapted to extend through the slot 65 when in one position and to move out of the slot when the piece 66 is pivoted towards a horizontal position; and a block 69 also pivotally mounted at 70 on the vertical leg for movement in a plane parallel to that of the leg 63, and having one surface adapted to abut the rear gate surface when the gate is closed, and having another surface abutted by the latch piece to prevent pivotal movement thereof when the latch piece is vertical. The toe portion 67 may have an aperture 71 therein to which a seal may be affixed when the hopper gate is locked so as to indicate if tampering has occurred.

To lock the gate after it has been moved to closed position, the block 69 is moved to vertical position abutting the gate, the toe portion 67 is disposed so that it extends through the slot 65 and a sealing device is passed through the aperture 71. To unlock the gate, the seal is broken, the latch piece is pivoted to draw the toe portion out of its slot and to clear the block which is then pivoted away from the gate.

From the foregoing description, it will be seen that the present invention provides an economical, reliable and simple hopper discharge apparatus wherein the friction between the moving parts is reduced to a minimum and wherein those parts most likely to become contaminated by accumulations of lading are self-cleaning. It will also be seen that the gate is supported in its closed position and during opening and closing by means which move with the gate and support it at about the center of that portion of it which actually underlies the hopper opening and therefore bears the lading load when the opening is closed. It will further be seen that the present invention provides an efficient method of assembling a discharge unit for use with hopper discharge openings. It should also be stated that the present invention provides an assembly which may readily be applied to many of the railway hopper car hoppers now in service.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What is claimed is:

1. In a hopper having a discharge opening therein, a gate longitudinally movable in a path parallel to the opening for controlling the opening, means for moving said gate in said path, said gate having an undersurface, at least one longitudinally disposed tread formed on said undersurface, gate supporting roller means rollably supported on the hopper for rolling movement relative thereto, said roller means providing an arcuate surface, said arcuate surface being in supporting and rolling engagement both with said hopper and with said longitudinally disposed tread whereby substantially the midpoint of the gate portion disposed in the opening is supported on the hopper in rolling engagement with said roller means when said gate is in closed position and during movement thereof away from and towards closed position.

2. Apparatus according to claim 1, wherein said gate has a set of teeth longitudinally disposed on said undersurface of said gate and said roller means includes a sprocket wheel engaging said teeth whereby movement of said gate will effect rolling movement of said gate supporting roller means in the same linear direction.

3. A discharge assembly for a hopper having side walls forming an opening therein comprising, frame means secured to the side walls providing a discharge chute and formed with a slot, a gate movable in said slot in a path parallel to the opening for controlling it, means for moving said gate in said path, and gate supporting roller means rollably mounted on said frame means and in rolling engagement with the undersurface of said gate and movable with said gate in the same direction and through half the distance of the linear movement of said gate to support the same.

4. A discharge assembly for a hopper having side walls defining an opening therein comprising frame means secured to the side walls and providing a discharge chute formed with a slot, a gate longitudinally movable in said slot in a path substantially parallel to the opening for controlling the latter, means for moving said gate in said path, gate supporting roller means rollably mounted on said frame means and movable with said gate to support the same, said gate being formed with a tread adjacent each longitudinal edge thereof, said gate and said frame each further having a set of teeth adjacent each tread and said roller means including two sprocket wheels, each sprocket wheel engaging one of said sets of teeth of said gate and of said frame, and each sprocket wheel further having a cylindrical surface in rolling engagement with one of said treads, said roller means further including a shaft extending crosswise of said gate and connecting together said sprocket wheels, whereby movement of said gate will effect movement of said gate supporting roller means in the same linear direction.

5. A discharge assembly for a hopper having side walls, said assembly comprising a frame secured to said side walls and having downward facing surfaces defining a bottom opening of said hopper, said frame being formed with a slot, said assembly further comprising a gate longitudinally movable in said slot in a path substantially parallel to said opening to control said opening and having surfaces engaging said downward facing surfaces to close said opening in the closed position of said gate, said gate being provided on its bottom surface adjacent each longitudinal edge thereof with a tread and two sets of rack teeth, gate moving means comprising a shaft mounted on said frame and having adjacent each end of said shaft a pinion engaging one of said sets of rack teeth, each of said pinions further having a trunnion rollingly engaging one of said treads of said gate, gate supporting roller means, said roller means having adjacent each end thereof a sprocket wheel and each sprocket wheel engaging a rack of said other set of rack teeth of said gate, each sprocket wheel further comprising a trunnion in rolling engagement with one of said treads of said gate, a bracket mounted on each side of said frame and formed with rack teeth and comprising a rail, said sprocket wheels being engaged in said bracket rack teeth and said sprocket trunnions rollingly resting on said rails, said treads of said gate further being formed with ramp portions engaging said trunnions of said pinions and of said sprocket wheels in the closed position of said gate, whereby said gate as it approaches closed position is lifted into tight engagement with said downwardly facing surfaces of said frame to tightly seal said opening.

6. In a hopper discharge control device, a rectangular frame comprising side and end members and defining a hopper discharge opening, a substantially flat gate longitudinally movable in said frame to control said opening, means for moving said gate, and gate supporting means including a pair of brackets mounted opposite each other inside said side members, said brackets each comprising a set of key hole shaped rack teeth defined by vertically extending slots open at top and bottom, said brackets each further comprising a rail, and said gate supporting means further comprising a roller, said roller having at each end a sprocket wheel, said sprocket wheel having a cylindrical trunnion, each said sprocket wheel engaging one of said sets of rack teeth and each said trunnion resting on and rollingly engaging one of said rails, said gate further resting on said gate moving means and on said trunnions and being formed with two sets of rack teeth and said sprocket wheels further engaging said sets of rack teeth of said gate, said roller thereby rolling with said gate to support the same and said sprocket wheels clearing said bracket rack teeth of lading accumulations.

7. A hopper discharge control device comprising a frame adapted to be secured to a hopper and defining a discharge opening, a substantially flat gate movable forwardly and rearwardly in said frame in a path substantially parallel to said opening to control the same, gate moving means and means supporting said gate and including a set of rack teeth located on each side of said frame and extending longitudinally therein, a set of rack teeth adjacent each side of said gate on the undersurface thereof, and a roller having a sprocket on each end thereof, said sprockets resting on and rollingly engaging said rack teeth of said frame and said gate rack teeth resting on and rollingly engaging said sprockets, said roller thereby being actuated by said gate to move in the same direction as said gate and through substantially half the linear distance traversed by the latter.

8. In a hopper discharge control device comprising a frame having downward facing surfaces defining a hopper opening, said device further comprising a substantially flat gate longitudinally movable forwardly and rearwardly in said frame for controlling said opening, said gate in forward position closing said opening, the improvement comprising longitudinally extending treads formed on the undersurface of said gate, roller means rotatably mounted in said frame adjacent the rear end of said gate, a second roller and means mounted on said frame and extending longitudinally of said gate and rollably supporting said second roller for rolling movement forwardly and rearwardly thereon, said treads of said gate resting on said roller means and on said second roller, said second roller being located substantially at the longitudinal midpoint of said opening and of said gate when said gate is in forward position, said second roller rollingly supporting said gate and moving simultaneously with said gate and for substantially half the linear distance traversed by said gate so as always to be located substantially at the longitudinal midpoint of that portion of said gate which is in said opening.

9. The method of assembling a hopper discharge opening control device comprising, forming a first frame means, securing roller support means on opposite inner side walls thereof, rollably mounting rollers on said support means, rotatably mounting operating means including a shaft and a pinion outwardly of said frame means, applying a gate having a toothed undersurface in said first frame means so as to engage and rest on said rollers for rolling support thereon and to intermesh the pinion with said toothed undersurface, and superimposing and welding a second frame means on said first frame means whereby its end surface contacts and has sealing engagement with the upper gate marginal surface.

10. The method of assembling a hopper discharge control device comprising, forming a first frame means and a second frame means, securing brackets having a series of teeth and an adjacent rail on opposite inner side walls of said first frame means adajcent an end thereof, positioning rollers means having teeth and an arcuate tread on said brackets to effect intermeshing of said bracket teeth and said roller means teeth and engagement of said rails and treads, mounting gate actuating means outwardly of said first frame means, applying a gate formed with teeth and a gate tread on a bottom surface thereof in said first frame means with said gate teeth intermeshing with said roller means teeth and said gate tread in engagement with said roller means tread, said gate being in operative engagement with said gate actuating means, and superimposing and welding said second frame means on said first frame means whereby its end surface contacts and has sealing engagement with the upper gate marginal surface and a slot remains between said first and second frame means at one side thereof for movement of said gate therein.

References Cited in the file of this patent
UNITED STATES PATENTS

| | | |
|---|---|---|
| 502,584 | Rettig | Aug. 1, 1893 |
| 820,240 | Mulock | May 8, 1906 |
| 1,275,376 | Brown | Aug. 13, 1918 |
| 1,715,307 | Porter | May 28, 1929 |
| 1,795,016 | Faber | Mar. 3, 1931 |
| 2,020,863 | Willoughby | Nov. 12, 1935 |
| 2,222,280 | Batho | Nov. 19, 1940 |
| 2,749,851 | Dorey | June 12, 1956 |
| 2,778,319 | Dorey | Jan. 22, 1957 |